US012209733B2

(12) United States Patent
Wen et al.

(10) Patent No.: US 12,209,733 B2
(45) Date of Patent: Jan. 28, 2025

(54) LED LAMP WITH SMALL NIGHTLIGHT FUNCTION

(71) Applicant: Xiamen Topstar Lighting Co., Ltd., Xiamen (CN)

(72) Inventors: Wenda Wen, Xiamen (CN); Xiaoyan Zhong, Xiamen (CN); Yuhan Lin, Xiamen (CN)

(73) Assignee: Xiamen Topstar Lighting Co., Ltd., Xiamen (CN)

( * ) Notice: Subject to any disclaimer, the term of this patent is extended or adjusted under 35 U.S.C. 154(b) by 0 days.

(21) Appl. No.: 18/748,519

(22) Filed: Jun. 20, 2024

(65) Prior Publication Data

US 2024/0337365 A1 Oct. 10, 2024

(30) Foreign Application Priority Data

Sep. 28, 2023 (CN) ......................... 202322652632.3

(51) Int. Cl.
*F21V 13/04* (2006.01)
*F21V 17/12* (2006.01)
*F21V 19/00* (2006.01)
*F21Y 115/10* (2016.01)

(52) U.S. Cl.
CPC .............. *F21V 13/04* (2013.01); *F21V 17/12* (2013.01); *F21V 19/003* (2013.01); *F21Y 2115/10* (2016.08)

(58) Field of Classification Search
CPC ........... F21V 3/04; F21V 17/12; F21V 19/003
See application file for complete search history.

(56) References Cited

U.S. PATENT DOCUMENTS

| | | | | |
|---|---|---|---|---|
| 8,240,880 B2 * | 8/2012 | Chen | F21V 7/0058 | 362/243 |
| 8,820,962 B2 * | 9/2014 | Kang | F21V 7/0058 | 362/240 |
| 9,618,184 B2 * | 4/2017 | Buchholz | F21V 33/0076 | |
| 11,648,871 B1 * | 5/2023 | Lan | B60Q 1/2607 | 340/458 |
| 2013/0229801 A1 * | 9/2013 | Breidenassel | F21V 29/83 | 362/235 |
| 2014/0211467 A1 * | 7/2014 | Yang | F21K 9/60 | 362/235 |
| 2016/0053966 A1 * | 2/2016 | Dassanayake | F21V 14/04 | 362/296.08 |
| 2017/0365136 A1 * | 12/2017 | Torre Sarmiento | F21V 31/005 | |
| 2024/0027054 A1 * | 1/2024 | Baker | B60Q 1/2611 | |

* cited by examiner

*Primary Examiner* — Tracie Y Green
*Assistant Examiner* — Michael Chiang
(74) *Attorney, Agent, or Firm* — Westbridge IP LLC

(57) ABSTRACT

An LED lamp with a small nightlight function includes a bulb shell, a light source plate and a reflector. The light source plate is provided with the reflector which has a light input end and a light output end, and the light source plate is provided with an inner-circle light source which is opposite to the light input end; and an outer-circle light source surrounding the inner-circle light source, the bulb shell has a first diffusion cover and a second diffusion cover connected to each other, the first diffusion cover covers the light output end of the reflector; the second diffusion cover is arranged between the reflector and the light source plate and opposite to the outside of the reflector; the outer-circle light source is opposite to the outside of the reflector.

7 Claims, 4 Drawing Sheets

LED LAMP WITH SMALL NIGHTLIGHT FUNCTION

CROSS-REFERENCE TO RELATED APPLICATIONS

This application claims priority to Chinese Patent Application No. 202322652632.3, filed on Sep. 28, 2023, the content of which is incorporated herein by reference in its entirety.

TECHNICAL FIELD

The present disclosure relates to the field of lamps and lanterns equipment, and in particular, to a Light Emitting Diode (LED) lamp with a small nightlight function.

BACKGROUND

LED lamps generally have only a main lighting function or only a small nightlight function, i.e., the individual lamp types all have one lighting function. In some LED lamps, there may be an LED bulb with a small nightlight function, and the bulb has a built-in light guide pillar that conducts the light source at the LED assembly to a reflection structure located at an upper end of the lampshade, realizing the small nightlight function of the part in combination with the control of the LED assembly.

SUMMARY

The technical problem to be solved by the present disclosure is to provide an LED lamp with a small nightlight function that has a main lighting function and a small nightlight function, and can independently realize the respective functions without affecting each other.

In order to solve the above technical problems, the present disclosure adopts the following technical solution: an LED lamp with a small nightlight function, comprising a bulb shell, a light source plate and a reflector, the light source plate being provided with the reflector, and the reflector comprises a light input end and a light output end, and the light source plate being provided with an inner-circle light source and an outer-circle light source surrounding the inner-circle light source, and the inner-circle light source being opposite to the light input end; the bulb shell comprises a first diffusion cover and a second diffusion cover connected to each other, the first diffusion cover covering the light output end of the reflector; the second diffusion cover being provided between the reflector and the light source plate; the outer-circle light source being opposite to the outside of the reflector, and the second diffusion cover being opposite to the outside of the reflector.

The present disclosure has the following beneficial effect: by arranging the bulb shell as the first diffusion cover and the second diffusion cover, under the separation of the inner-circle light source and the outer-circle light source on the light source plate by the reflector, the light from the inner-circle light source is emitted at the first diffusion cover through the light input end and the light output end of the reflector, realizing the main lighting function, while the light from the outer-circle light source is emitted along an outer wall of the reflector towards the second diffusion cover, realizing the small nightlight function; the first diffusion cover emits light on a front side of the whole lamp structure, and the second diffusion cover emits light in the circumferential direction of the whole structure, and the first diffusion cover and the second diffusion cover are arranged at different structural positions, and can operate independently without affecting each other.

DETAILED DESCRIPTION OF THE EMBODIMENTS

Figure 1:
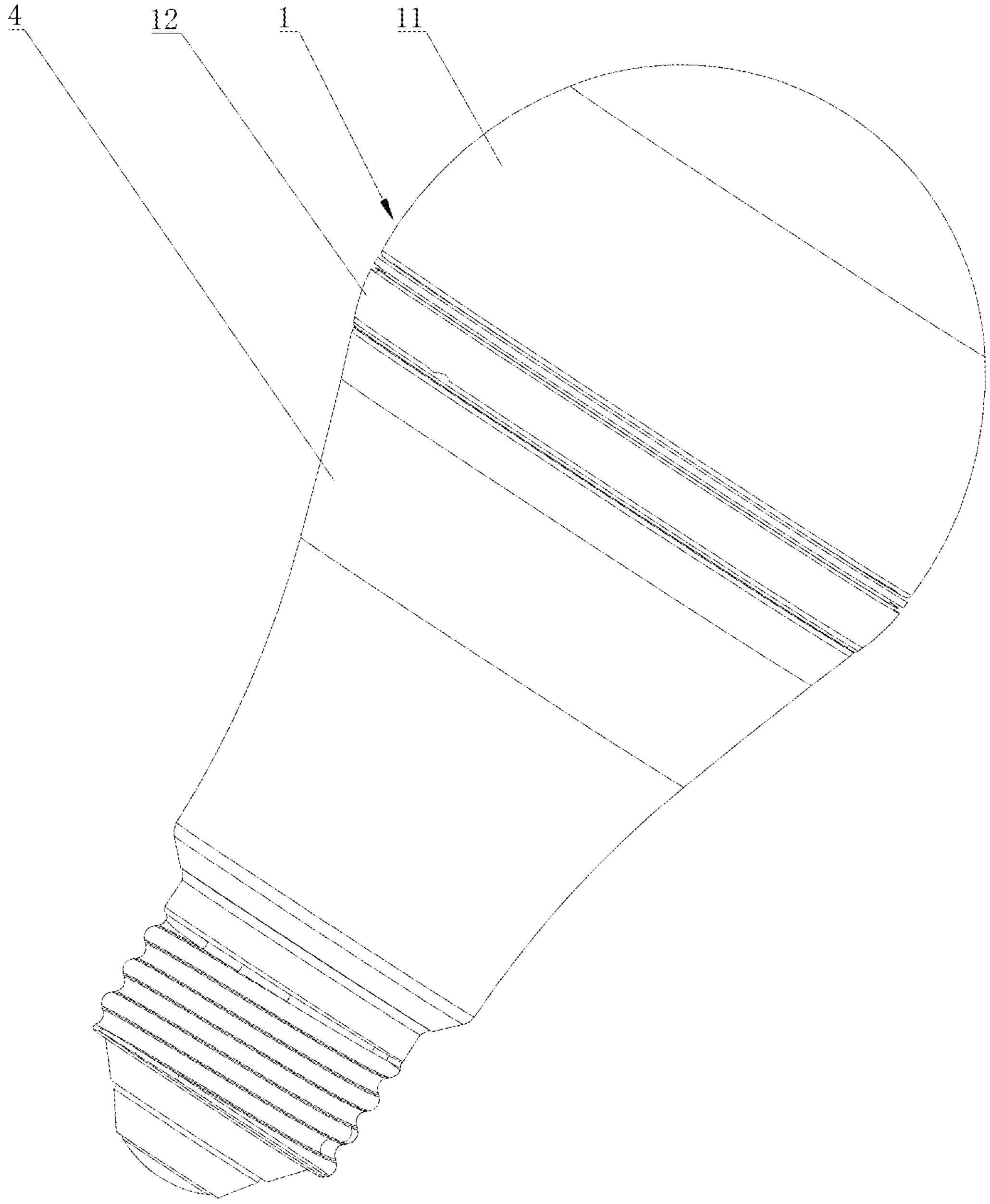
FIG. 1 is a structural schematic diagram of an LED lamp with a small nightlight function according to one or more embodiments.

In order to explain in detail the technical content, the purpose and effect of the present disclosure, the following is explained in conjunction with the embodiments and with the accompanying drawings.

In some LED lamps, there may be an LED bulb with a small nightlight function, and the bulb has a built-in light guide pillar that conducts the light source at the LED assembly to a reflection structure located at an upper end of the lampshade, realizing the small nightlight function of the part in combination with the control of the LED assembly. However, since the assembly related to the small nightlight function is located at an upper end of the lampshade, the main lighting function at the LED assembly will be affected, and the lighting effect is not good in use.

In some embodiments, referring to FIGS. 1 to 4, an LED lamp with a small nightlight function comprises a bulb shell 1, a light source plate 3 and a reflector 2, the light source plate 3 being provided with the reflector 2, and the reflector 2 comprises a light input end and a light output end, and the light source plate 3 being provided with an inner-circle light source 31 and an outer-circle light source 32 surrounding the inner-circle light source 31, and the inner-circle light source 31 being opposite to the light input end; the bulb shell 1 comprises a first diffusion cover 11 and a second diffusion cover 12 connected to each other, the first diffusion cover 11 covering the light output end of the reflector 2; the second diffusion cover 12 being provided between the reflector 2 and the light source plate 3; the outer-circle light source 32 being opposite to the outside of the reflector 2, and the second diffusion cover 12 being opposite to the outside of the reflector 2.

As can be seen from the above description, the present disclosure has the following beneficial effect: by arranging the bulb shell 1 as the first diffusion cover 11 and the second diffusion cover 12, under the separation of the inner-circle light source 31 and the outer-circle light source 32 on the light source plate 3 by the reflector 2, the light from the inner-circle light source 31 is emitted at the first diffusion cover through the light input end and the light output end of the reflector, realizing the main lighting function, while the light from the outer-circle light source 32 is emitted along an outer wall of the reflector 2 towards the second diffusion cover 12, realizing the small nightlight function; the first diffusion cover 11 emits light on a front side of the whole lamp structure, and the second diffusion cover 12 emits light in the circumferential direction of the whole structure, and the first diffusion cover 11 and the second diffusion cover 12 are arranged at different structural positions, and can operate independently without affecting each other.

In some embodiments, the second diffusion cover 12 is clamped to the outside of the reflector 2, and the first diffusion cover 11 is clamped to the inside of the reflector 2.

As can be seen from the above description, in particular, the first diffusion cover 11 and the second diffusion cover 12 are respectively connected to the reflector 2 in the form of clamping, and the clamping design facilitates the assembly of the lamp.

In some embodiments, an inner wall of the second diffusion cover 12 is provided with a protruding first clamping block 121 in the circumferential direction thereof, and an outer wall of the reflector 2 is provided with a first clamping groove 22 in the circumferential direction thereof, and the first clamping groove 22 is clamped with the first clamping block 121; an inner wall of the reflector 2 is provided with a second clamping block 23 in the circumferential direction thereof, and an outer wall of the first diffusion cover 11 is provided with a second clamping groove 111 in the circumferential direction thereof, and the second clamping block 23 is clamped with the second clamping groove 111.

As can be seen from the above description, the first clamping block 121 protruding from the inner wall of the second diffusion cover 12 is clamped with the first clamping groove 22 on an outer wall of the reflector 2, and the second clamping block 23 protruding from the inner wall of the reflector 2 is clamped with the second clamping groove 111 on the outer wall of the first diffusion cover 11.

In some embodiments, a first inclined guiding surface is provided on an upper side of the first clamping block 121 and a second inclined guiding surface is provided on an upper side of the second clamping block 23.

As can be seen from the above description, the design of the first inclined guiding surface and the second inclined guiding surface enables that when the reflector 2 is pressed in towards the second diffusion cover 12 and the first diffusion cover 11 is pressed in towards the reflector 2, the abutting structure moves smoothly along the inclined guiding surface, and finally clamps into the position.

In some embodiments, further comprising a plastic shell 4, the plastic shell 4 is clamped to an end of the second diffusion cover 12 away from the first diffusion cover 11.

As can be seen from the above description, the plastic shell 4 and the second diffusion cover 12 adopts a fast and quick connection design.

In some embodiments, an inner wall of the plastic shell 4 is provided with a protruding third clamping block 41 in the circumferential direction thereof, and an outer wall of the second diffusion cover 12 is provided with a third clamping groove 122 in the circumferential direction thereof, and the third clamping block 41 is clamped with the third clamping groove 122.

As can be seen from the above description, the clamping of the two is realized by the cooperation of the third clamping block 41 of the plastic shell 4 with the third clamping groove 122 of the second diffusion cover 12.

In some embodiments, the light input end of the reflector 2 is clamped with the light source plate 3.

As can be seen from the above description, the reflector 2 is clamped with the light source plate 3 through its light input end to ensure that the two are relatively fixed, so that the inner-circle light source 31 and the outer-circle light source 32 emit light accurately corresponding to their respective areas.

In some embodiments, the light input end of the reflector 2 is connected with the light source plate 3 through a screw lock.

As can be seen from the above description, the reflector 2 can be relatively fixed to the light source plate 3 by means of screw locking, so that the inner-circle light source 31 and the outer-circle light source 32 emit light accurately corresponding to their respective areas.

In some embodiments, the light source plate 3 is provided with a plurality of bayonets 33 at intervals around the inner-circle light source 31, and the light input end of the reflector 2 corresponding to the bayonets 33 is extended with a plurality of clamping hooks 21 that are clamped with the bayonets.

As can be seen from the foregoing description, the fast fixing of the reflector 2 and the light source plate 3 is realized by clamping the bayonet 33 on the light source plate 3 with the clamping hook 21 at the light input end of the reflector 2.

In at least one embodiment, application scenario of the present disclosure: in the design of an LED lamp that needs to have both a main lighting function and a small nightlight function, the lighting effect is better compared to other ways.

As shown in FIGS. 1 to 4, the LED lamp with a small nightlight function of this embodiment comprises a bulb shell 1, a light source plate 3, a reflector 2, a plastic shell 4, and a heat sink. The material of the bulb shell 1 is selected according to the actual design requirements, including glossy glass, frosted glass, PC (Polycarbonate), PP (Polypropylene), etc., for example, glass is selected for the bulb shell 1 in this embodiment. Meanwhile, the material transmittance and color of the bulb shell 1 are selected according to the actual design requirements, for example, the transmittance comprises 98%, 95% and other values, and the color comprises blue, red and the like. The color is achieved by applying a light diffusing agent inside the material, for example by applying a light diffusing agent inside the glass to achieve the corresponding color, or by using different PC colors.

Figure 2:
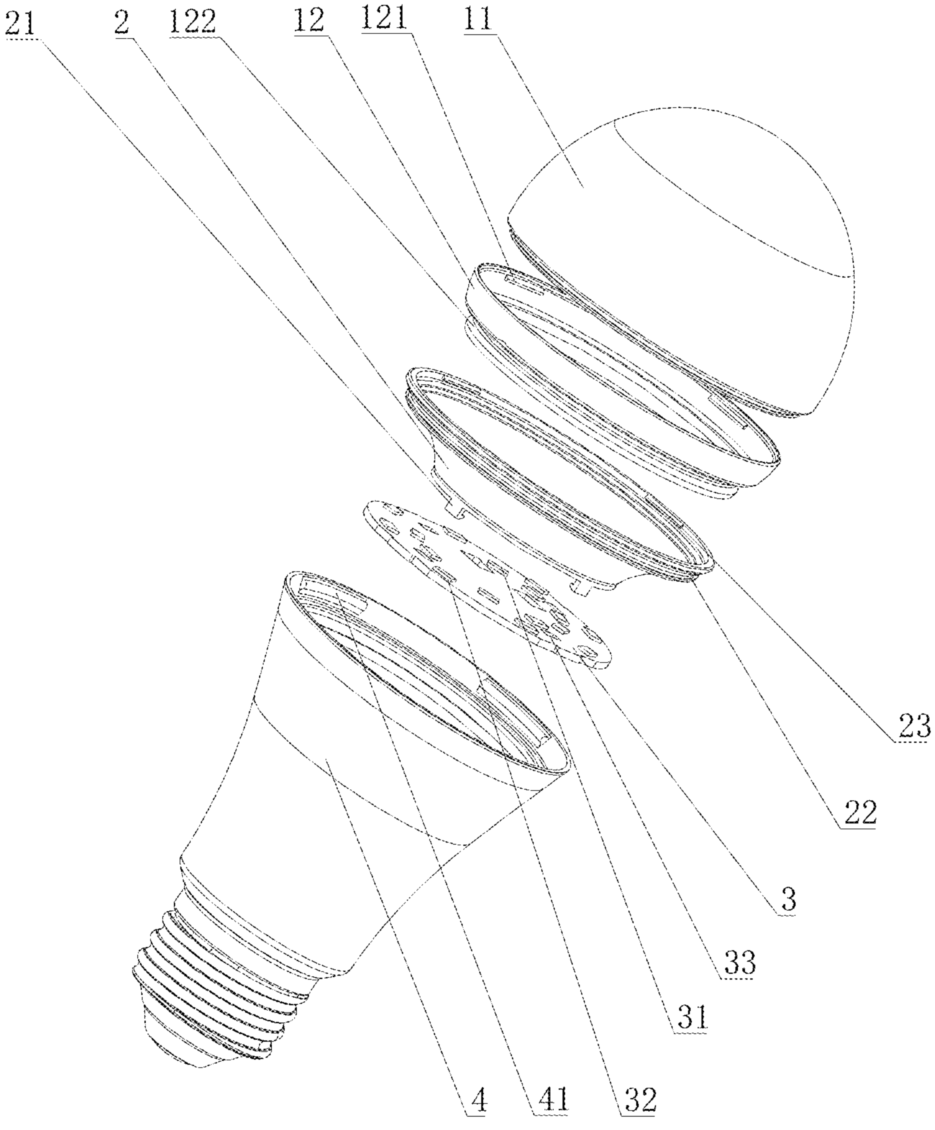
FIG. 2 is an exploded view of the LED lamp with a small nightlight function according to one or more embodiments.
Figure 3:
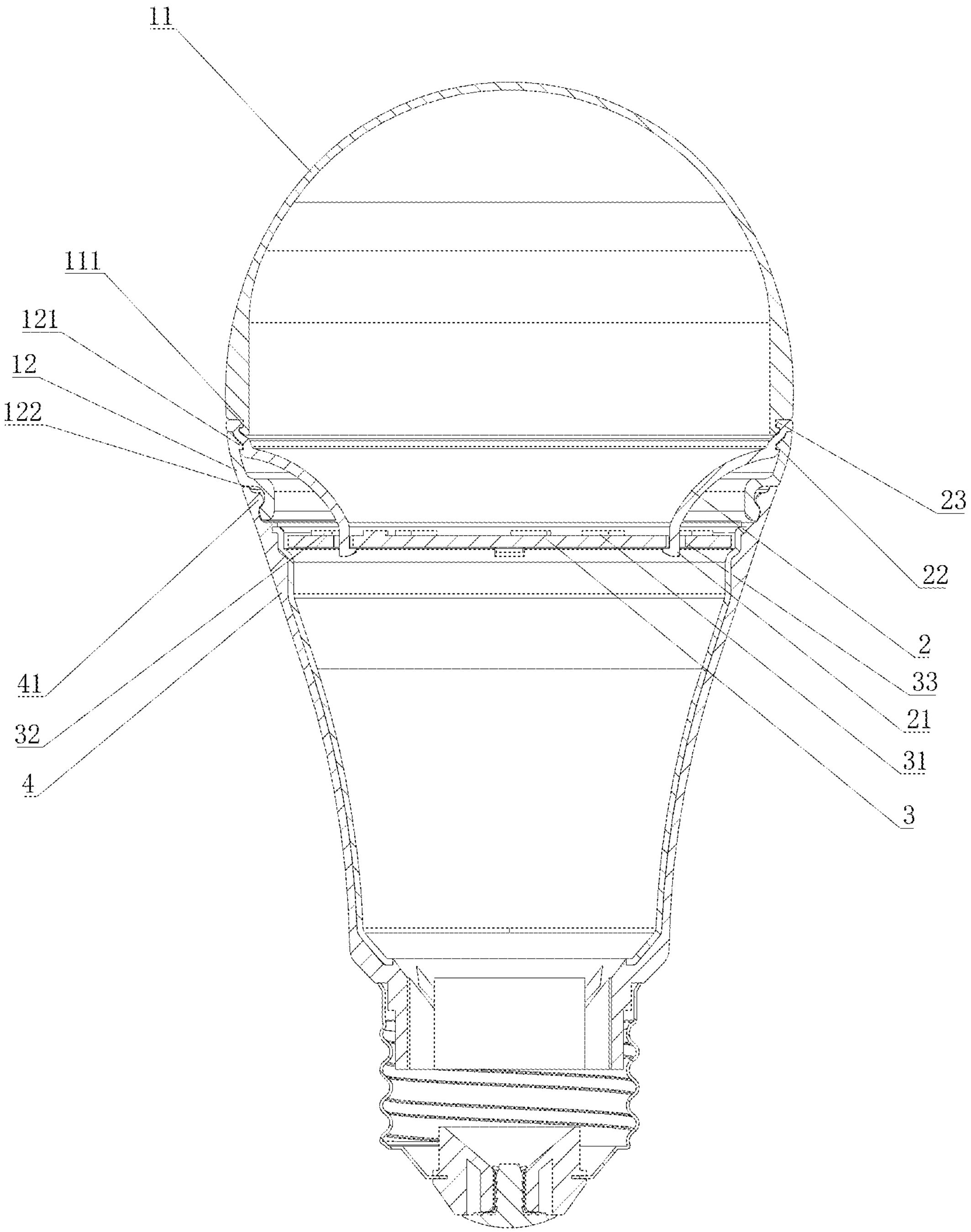
FIG. 3 is a sectional view of the LED lamp with a small nightlight function according to one or more embodiments.

As shown in FIGS. 2 and 3, the reflector 2 is provided on the light source plate 3, and the reflector 2 comprises the light input end and the light output end. The light source plate 3 is provided with the inner-circle light source 31 and the outer-circle light source 32 surrounding the inner-circle light source 31. The inner-circle light source 31 is opposite to the light input end. The light input end of the reflector 2 is clamped with the light source plate 3. Specifically, the light source plate 3 is provided with a plurality of bayonets 33 at intervals around the inner-circle light source 31, and the light input end of the reflector 2 corresponding to the bayonets 33 is extended with a plurality of clamping hooks 21 that are clamped with the bayonets.

Figure 4:
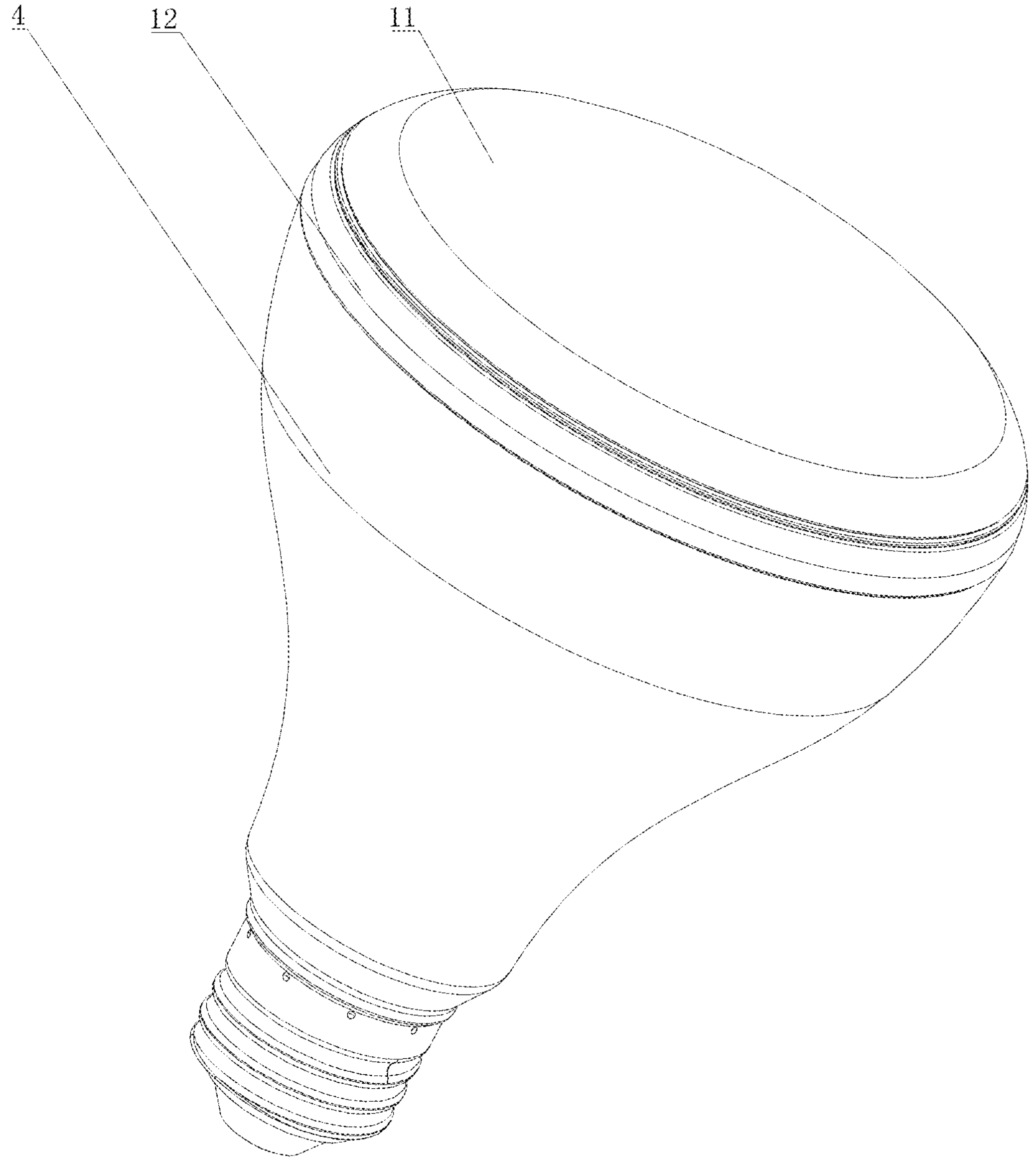
FIG. 4 is a structural schematic diagram of an LED lamp with a small nightlight function according to another one or more embodiments.

As shown in FIGS. 1, 3 and 4, the bulb shell 1 comprises the first diffusion cover 11 and the second diffusion cover 12 connected to each other, the first diffusion cover 11 covering the light output end of the reflector 2; the second diffusion cover 12 is provided between the reflector 2 and the light source plate 3; the outer-circle light source 32 is opposite to the outside of the reflector 2, and the second diffusion cover 12 is opposite to the outside of the reflector 2.

In some optional implementations, the first diffusion cover 11 and the second diffusion cover 12 are independently designed; for example, the first diffusion cover 11 is made of transparent glass, with a light transmittance of 98%; the second diffusion cover 12 is made of light yellow PP, with a light transmittance of 90%. The thickness of the first diffusion cover 11 ranges from 0.4-5 mm; as shown in FIG.

3, the thickness of the top of said first diffusion cover 11 is less than the thickness of the bottom connection position; and the thickness of the first diffusion cover 11 is set according to the actual light transmission requirements: for example, the thickness of the design can be 0.4 mm, 0.5 mm, 1 mm, 2 mm, 5 mm, and so on, and in the actual design process, if a larger light transmittance is required, the thickness is reduced; if a smaller light transmittance is required, the thickness is increased. Likewise, the thickness of the second diffusion cover 12 can also be adjusted according to the actual application. The reflector 2 is further provided with a bending angle, the bending angle is the angle between the reflector 2 and the light source plate 3, and the bending angle is adjusted according to the brightness and darkness of the actual required light output, e.g. reducing the height of the reflector 2 and the bending angle when there is a need to reduce the range of the light output of outer-circle light source 32. Meanwhile, the second diffusion cover 12 is adjusted accordingly to the adjustment of the structure of the reflector 2, e.g. the height of the second diffusion cover 12 is reduced.

The second diffusion cover 12 is clamped to the outside of the reflector 2, and the first diffusion cover 11 is clamped to the inside of the reflector 2. Specifically, the inner wall of the second diffusion cover 12 is provided with the protruding first clamping block 121 in the circumferential direction thereof, and an outer wall of the reflector 2 is provided with the first clamping groove 22 in the circumferential direction thereof, and the first clamping groove 22 is clamped with the first clamping block 121; the inner wall of the reflector 2 is provided with the second clamping block 23 in the circumferential direction thereof, and the outer wall of the first diffusion cover 11 is provided with the second clamping groove 111 in the circumferential direction thereof, and the second clamping block 23 is clamped with the second clamping groove 111. Meanwhile, the first inclined guiding surface is provided on the upper side of the first clamping block 121 and the second inclined guiding surface is provided on the upper side of the second clamping block 23. In some optional embodiments, the first diffusion cover 11 is connected to the reflector 2, and the first diffusion cover 11 is connected to the second diffusion cover 12 by means of bonding.

As shown in FIGS. 2 and 3, the plastic shell 4 is clamped to the end of the second diffusion cover 12 away from the first diffusion cover 11. Specifically, the inner wall of the plastic shell 4 is provided with the third clamping block 41 in the circumferential direction thereof, and the outer wall of the second diffusion cover 12 is provided with the third clamping groove 122 in the circumferential direction thereof, and the third clamping block 41 is clamped with the third clamping groove 122. The clamping of the second diffusion cover 12 and the plastic shell 4 and the clamping of the second diffusion cover 12 and the reflector 2 enable the reflector 2 be fixedly confined to an upper side of the plastic shell 4, and the light source plate 3 is clamped and fixed with the inner wall surface of the plastic shell. In this way, there is no need to set up a relevant connection structure again between the reflector 2 and the light source plate 3 according to the actual needs. In an optional embodiment, the reflector 2 is connected to the light source plate 3 by means of locking screws.

The heat sink is arranged in the plastic shell 4 and is located on the side of the light source plate 3 away from the first diffusion cover 11.

In at least one embodiment, the light input end of the reflector 2 is connected with the light source plate 3 through a screw lock. A more reliable form of screw locking can be used to ensure the connection and fixation of the reflector 2 with the light source plate 3, which improves the integrality; meanwhile, the relative arrangement of the inner-circle light source 31 and the outer-circle light source 32 with the corresponding portions of the reflector 2 is ensured.

Working principle of the present disclosure: when used as the main lighting function, the inner-circle light source 31 emits light, and the light rays pass through the light input end, the light output end and the first diffusion cover 11 of the reflector 2 in turn, and emit from the front of the whole lamp; when used as the small nightlight function, the outer-circle light source 32 emits light, and the light rays reflect from the outer wall of the reflector 2 and pass through the second diffusion cover 12, and emit from the side of the whole lamp.

In the assembly of the whole lamp, the reflector 2 and the first diffusion cover 11, the reflector 2 and the second diffusion cover 12, the reflector 2 and the light source plate 3, and the second diffusion cover 12 and the plastic shell 4 are all in the form of a quick clamping design, which is convenient for assembly and maintenance.

In summary, the LED lamp with a small nightlight function provided by the present disclosure, by arranging the bulb shell as the first diffusion cover and the second diffusion cover, under the separation of the inner-circle light source and the outer-circle light source on the light source plate by the reflector, the light from the inner-circle light source is emitted at the first diffusion cover through the light input end and the light output end of the reflector, realizing the main lighting function, while the light from the outer-circle light source is emitted along an outer wall of the reflector towards the second diffusion cover, realizing the small nightlight function; the first diffusion cover emits light on a front side of the whole lamp structure, and the second diffusion cover emits light in the circumferential direction of the whole structure, and the first diffusion cover and the second diffusion cover are arranged at different structural positions, and can operate independently without affecting each other.

The above mentioned are only embodiments of the present disclosure, and are not intended to limit the scope of the patent of the present disclosure. All equivalent transformations made using the content of the present disclosure and the accompanying drawings, or directly or indirectly used in the relevant technical fields, are equally included in the scope of patent protection of the present disclosure.

What is claimed is:

1. A Light Emitting Diode (LED) lamp with a small nightlight function, comprising a bulb shell, a light source plate and a reflector, wherein the light source plate is provided with the reflector, and the reflector comprises a light input end and a light output end, and the light source plate is provided with an inner-circle light source and an outer-circle light source surrounding the inner-circle light source, and the inner-circle light source is on the light input end and facing the light input end;

the bulb shell comprises a first diffusion cover and a second diffusion cover connected to each other, the first diffusion cover covers the light output end of the reflector; the second diffusion cover is arranged between the reflector and the light source plate; the outer-circle light source is facing an outside of the reflector, and the second diffusion cover is facing the outside of the reflector;

the second diffusion cover is clamped to the outside of the reflector, and the first diffusion cover is clamped to an inside of the reflector; and an inner wall of the second diffusion cover is provided with a protruding first clamping block in the circumferential direction thereof, and an outer wall of the reflector is provided with a first clamping groove in the circumferential direction thereof, and the first clamping groove is clamped with the first clamping block; an inner wall of the reflector is provided with a second clamping block in the circumferential direction thereof, and an outer wall of the first diffusion cover is provided with a second clamping groove in the circumferential direction thereof, and the second clamping block is clamped with the second clamping groove.

2. The LED lamp according to claim 1, wherein a first inclined guiding surface is provided on an upper side of the first clamping block and a second inclined guiding surface is provided on an upper side of the second clamping block.

3. The LED lamp according to claim 1, further comprising a plastic shell clamped to an end of the second diffusion cover away from the first diffusion cover.

4. The LED lamp according to claim 3, wherein an inner wall of the plastic shell is provided with a protruding third clamping block in the circumferential direction thereof, and an outer wall of the second diffusion cover is provided with a third clamping groove in the circumferential direction thereof, and the third clamping block is clamped with the third clamping groove.

5. The LED lamp according to claim 1, wherein the light input end of the reflector is clamped with the light source plate.

6. The LED lamp according to claim 5, wherein the light source plate is provided with a plurality of bayonets at intervals around the inner-circle light source, and the light input end of the reflector corresponding to the bayonets is extended with a plurality of clamping hooks that are clamped with the bayonets.

7. The LED lamp according to claim 1, wherein the light input end of the reflector is connected with the light source plate through a screw lock.

* * * * *